US012370722B2

(12) United States Patent
III et al.

(10) Patent No.: US 12,370,722 B2
(45) Date of Patent: Jul. 29, 2025

(54) DEVICE FOR PRODUCING A MULTI-COMPONENT MIXTURE AND METHOD FOR OPERATING SAID TYPE OF DEVICE

(71) Applicant: Henkel AG & Co., KGaA, Duesseldorf (DE)

(72) Inventors: Bernhard III, Hohenweiler (AT); Mario Metzler, Goetzis (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 673 days.

(21) Appl. No.: 17/543,368

(22) Filed: Dec. 6, 2021

(65) Prior Publication Data

US 2022/0088830 A1     Mar. 24, 2022

Related U.S. Application Data

(63) Continuation of application No. PCT/EP2020/065917, filed on Jun. 9, 2020.

(30) Foreign Application Priority Data

Jun. 11, 2019 (DE) .......................... 102019208473.7

(51) Int. Cl.
*B01F 35/95* (2022.01)
*B01F 27/09* (2022.01)
(Continued)

(52) U.S. Cl.
CPC ............ *B29B 7/826* (2013.01); *B01F 27/092* (2022.01); *B01F 35/95* (2022.01); *B29B 7/401* (2013.01);
(Continued)

(58) Field of Classification Search
CPC ...................................................... B01F 35/95
(Continued)

(56) References Cited

U.S. PATENT DOCUMENTS

| 172,068 | A | * | 1/1876 | Babbitt | ................... | B01F 35/95 |
| | | | | | | 165/92 |
| 1,156,851 | A | * | 10/1915 | Pfouts | ..................... | B01F 35/95 |
| | | | | | | 366/147 |

(Continued)

FOREIGN PATENT DOCUMENTS

| AT | 517337 A4 | 1/2017 |
| DE | 626344 C | 2/1936 |

(Continued)

OTHER PUBLICATIONS

International Search Report for PCT/EP2020/065917 mailed Sep. 10, 2020.

(Continued)

*Primary Examiner* — David L Sorkin
(74) *Attorney, Agent, or Firm* — Mary K. Cameron

(57) ABSTRACT

The invention relates to a device for producing a multi-component mixture, comprising a mixing chamber and a mixing device, wherein the mixing device has a stirrer which is arranged in the mixing chamber and which is rotatably driven about an axis of rotation L, wherein a temperature control channel system for controlling the temperature of the stirrer and through which a temperature control medium can flow is arranged inside the stirrer.

10 Claims, 3 Drawing Sheets

(51) Int. Cl.
    *B29B 7/40*   (2006.01)
    *B29B 7/82*   (2006.01)
    *B01F 35/90*  (2022.01)
    *B01F 101/00* (2022.01)

(52) U.S. Cl.
    CPC .......... *B29B 7/407* (2013.01); *B01F 2035/98* (2022.01); *B01F 2035/99* (2022.01); *B01F 2101/2805* (2022.01)

(58) Field of Classification Search
    USPC ................ 366/147; 165/DIG. 152, DIG. 155
    See application file for complete search history.

(56)  References Cited

U.S. PATENT DOCUMENTS

| | | | | |
|---|---|---|---|---|
| 1,587,840 | A * | 6/1926 | Kilmer | B01F 35/95 366/147 |
| 1,667,944 | A * | 5/1928 | Nichols | B01F 35/95 165/92 |
| 2,004,009 | A * | 6/1935 | Moir | A23G 3/22 366/147 |
| 2,687,830 | A * | 8/1954 | Doering | A01J 21/02 366/147 |
| 3,165,785 | A | 1/1965 | Hehl | |
| 3,182,971 | A | 5/1965 | Wakeman et al. | |
| 3,241,606 | A * | 3/1966 | Honjo | B01F 35/95 366/147 |
| 3,310,836 | A * | 3/1967 | Nichols | B29C 48/845 366/147 |
| 3,887,170 | A | 6/1975 | Heindl | |
| 4,067,553 | A | 1/1978 | Yamaoka | |
| 4,142,805 | A | 3/1979 | Tadmor | |
| 4,183,676 | A | 1/1980 | Engels et al. | |
| 5,180,225 | A * | 1/1993 | Piccolo, Sr. | B29B 7/823 366/147 |
| 5,723,079 | A | 3/1998 | Fujita et al. | |
| 5,843,489 | A * | 12/1998 | Nakano | B29B 7/488 366/147 |
| 5,925,295 | A | 7/1999 | Nakamura et al. | |
| 6,592,249 | B1 | 7/2003 | Hausbichler et al. | |
| 7,540,651 | B2 * | 6/2009 | Matsumoto | B01F 33/831 366/147 |
| 2005/0255015 | A1 | 11/2005 | Le | |
| 2015/0165403 | A1 | 6/2015 | Lutz et al. | |

FOREIGN PATENT DOCUMENTS

| | | |
|---|---|---|
| DE | 100400 A5 | 9/1973 |
| DE | 3210978 A1 | 9/1983 |
| DE | 3304129 A1 | 8/1984 |
| DE | 4235850.7 A1 | 4/1994 |
| DE | 29723102 U1 | 3/1998 |
| DE | 29819785 U1 | 1/1999 |
| DE | 19848357 A1 | 4/2000 |
| DE | 202005011120 U1 | 9/2005 |
| DE | 102012002047 A1 | 9/2012 |
| DE | 102012103885 A1 | 11/2013 |
| DE | 202017103837 U1 | 10/2018 |
| EP | 0328154 A1 | 8/1989 |
| JP | H03288612 A | 12/1991 |
| JP | H03288613 A | 12/1991 |
| JP | H0631724 A | 2/1994 |
| JP | 2019039527 A | 3/2019 |
| WO | 2017004637 A1 | 1/2017 |
| WO | 2017004641 A1 | 1/2017 |

OTHER PUBLICATIONS

International Search Report for PCT/EP2020/065919 mailed Sep. 10, 2020.

* cited by examiner

DEVICE FOR PRODUCING A MULTI-COMPONENT MIXTURE AND METHOD FOR OPERATING SAID TYPE OF DEVICE

The invention relates to a device for producing a multi-component mixture, the device comprising a mixing chamber and a mixing device, wherein the mixing device has a stirrer which is arranged in the mixing chamber and is rotatably driven about an axis of rotation. It also relates to a method for operating such a device.

DE 10 2012 103 885 A1 discloses a device for producing a multi-component mixture, wherein the mixing chamber can be rinsed and the temperature of said chamber can be controlled by means of water channels embedded in the chamber wall.

Mixing devices of this type are used to mix a number of components of a plastics mixture together immediately before use and make them available for processing. For example, the mixing chamber can have an outlet through which a strand of the finished mixture can be dispensed and applied to a surface, for example by means of a robot arm.

The problem with this is that, in the event of long waiting times between individual doses, the stirrer becomes heavily soiled and difficult to clean because the components to be mixed react with one another in the mixing chamber.

The object of the invention is therefore to provide a device for producing a multi-component mixture in which the soiling of the stirrer is at least greatly reduced. A method for operating such a device is also to be provided.

This object is achieved by means of the subject matter of claims 1 and 9. Further embodiments and advantageous designs are found in the dependent claims.

According to one aspect of the invention, a device for producing a multi-component mixture is specified, comprising a mixing chamber and a mixing device, wherein the mixing device has a stirrer which is arranged in the mixing chamber and is rotatably driven about an axis of rotation, wherein a temperature control channel system through which a temperature control medium can flow is arranged inside the stirrer for the purpose of controlling the temperature of the stirrer.

It is conceivable for the temperature control channel system to be designed as a heating channel system, through which a heating medium can flow as a temperature control medium and which is provided for heating the stirrer. In this way, for example, reactions of the components can be influenced and in particular accelerated. As an alternative thereto, it is conceivable for the temperature control channel system to be designed as a cooling channel system, through which a cooling medium can flow as a temperature control medium and which is provided for cooling the stirrer. A device of this kind is advantageous in that, when the stirrer has a relatively low temperature, a reaction between the components can be slowed down at least on the surface of the stirrer. The reaction in the mixing chamber takes place substantially according to the Van't Hoff rule. As has been found, a reduction in temperature by 10° C. can increase the pot life locally by a factor of 2 to 3. Soiling on the stirrer can thus be reduced.

According to one embodiment of the invention, the stirrer is arranged on a shaft which is connected to the stirrer in the region of its first end and is rotatably driven in the region of its second end. In an arrangement of this kind, the stirrer can be designed to be axially movable within the mixing chamber so that it can be lowered and raised in the direction of the axis of rotation in order to close or open an outlet located at the bottom of the mixing chamber. In this way, a fully prepared multi-component mixture can be dispensed after the mixing process for further use.

When using a stirrer, its speed is preferably adjustable. The speed of the stirrer can particularly preferably be set to a value between 1 rpm and 6000 rpm. It can very particularly preferably be set to a value between 800 rpm and 3000 rpm.

The pressure in the mixing chamber is preferably in a range between 0.5 bar and 4.0 bar, preferably in a range between 1.5 bar and 3.0 bar. However, applications can also be considered in which a pressure of up to 50 bar prevails in the mixing chamber, and so the mixing chamber is preferably designed so as to withstand an internal pressure which has a value in a range between 0.5 bar and 50 bar.

According to one embodiment, the temperature control channel system is arranged in cavities of the stirrer, and walls of the cavities form walls of the temperature control channel system.

This arrangement, in which in particular an axially extending cavity can be provided as a temperature control channel, is advantageous in that the temperature control is particularly efficient since the temperature control medium is in direct contact with the stirrer.

In order to create an efficient temperature control circuit, in this embodiment the shaft can have a temperature control channel system which is fluidically connected to the temperature control channel system of the stirrer, wherein an inflow portion and an outflow portion for the temperature control medium are provided in the region of the second end of the shaft.

In this embodiment, the inflow portion and the outflow portion are thus provided outside the mixing chamber in the region of the second end of the shaft, the inflow portion and the outflow portion being arranged, for example, in chambers which are filled with the temperature control medium and in which a different pressure prevails, so that the medium flows through the temperature control channel system from the inflow portion to the outflow portion. The flow can be directed by a pipe which is connected to the outlet being arranged within the at least one temperature control channel. While, for example, one end of the pipe is connected to the outlet in the region of the second end of the shaft, a second end of the pipe can be arranged in the temperature control channel system of the stirrer and in particular in a distal region of the temperature control channel system such that the temperature control medium in the temperature control channel system can flow forth outside the stirrer and flow back within the stirrer.

According to an alternative embodiment, the temperature control channel system is formed in a temperature control lance which is arranged in a cavity of the stirrer.

This embodiment is advantageous in that the stirrer, which has to be replaced frequently, for example with every shift change, does not have to be sealed off from the temperature control medium at the transition to the shaft. Instead, the temperature control medium only circulates within the temperature control lance. In this case, the temperature control lance can be guided in a cavity of the shaft up to its second end, and an inflow portion and an outflow portion for the temperature control medium can be provided in the region of the second end of the shaft.

In this embodiment, the temperature control medium only circulates within the temperature control lance, which is plugged or screwed into the stirrer. In this case, a gap between an outer wall of the temperature control lance and the walls of the cavity of the stirrer can be kept particularly small in order to achieve the best possible heat transfer and thus the best possible temperature control.

According to a further alternative embodiment, the temperature control channel system is formed by means of a heat pipe which is arranged in a cavity of the stirrer. This embodiment is also advantageous in that sealing between the stirrer and the shaft does not have to be liquid-tight.

In this embodiment, the heat pipe can be guided in particular in a cavity of the shaft up to its second end, wherein active temperature control of the heat pipe is provided in the region of the second end of the shaft, for example air or water temperature control.

According to a further aspect of the invention, a method is specified for operating a device for producing a multi-component mixture, which device comprises a mixing chamber and a mixing device, wherein the mixing device has a stirrer which is arranged in the mixing chamber and is rotatably driven about an axis of rotation, wherein the temperature of the stirrer is controlled.

The temperature of the stirrer is controlled, for cooling in particular, by removing heat from the interior of the stirrer by means of a cooling medium, or alternatively, for heating in particular, by supplying heat from the interior of the stirrer by means of a heating medium.

The speed of the stirrer is preferably adjustable and can be set to a value between 1 rpm and 6000 rpm. The speed is very particularly preferably set to a value between 800 rpm and 3000 rpm.

The mixing chamber is preferably subjected to a pressure in the range between 0.5 bar and 4.0 bar, preferably in a range between 1.5 bar and 3.0 bar. However, applications can also be considered in which a pressure of up to 50 bar prevails in the mixing chamber, and so the mixing chamber is preferably designed so as to withstand an internal pressure which has a value in a range between 0.5 bar and 50 bar.

The method has the advantages described in connection with the device.

Embodiments of the invention are explained in more detail below with reference to schematic drawings.

Figure 1:
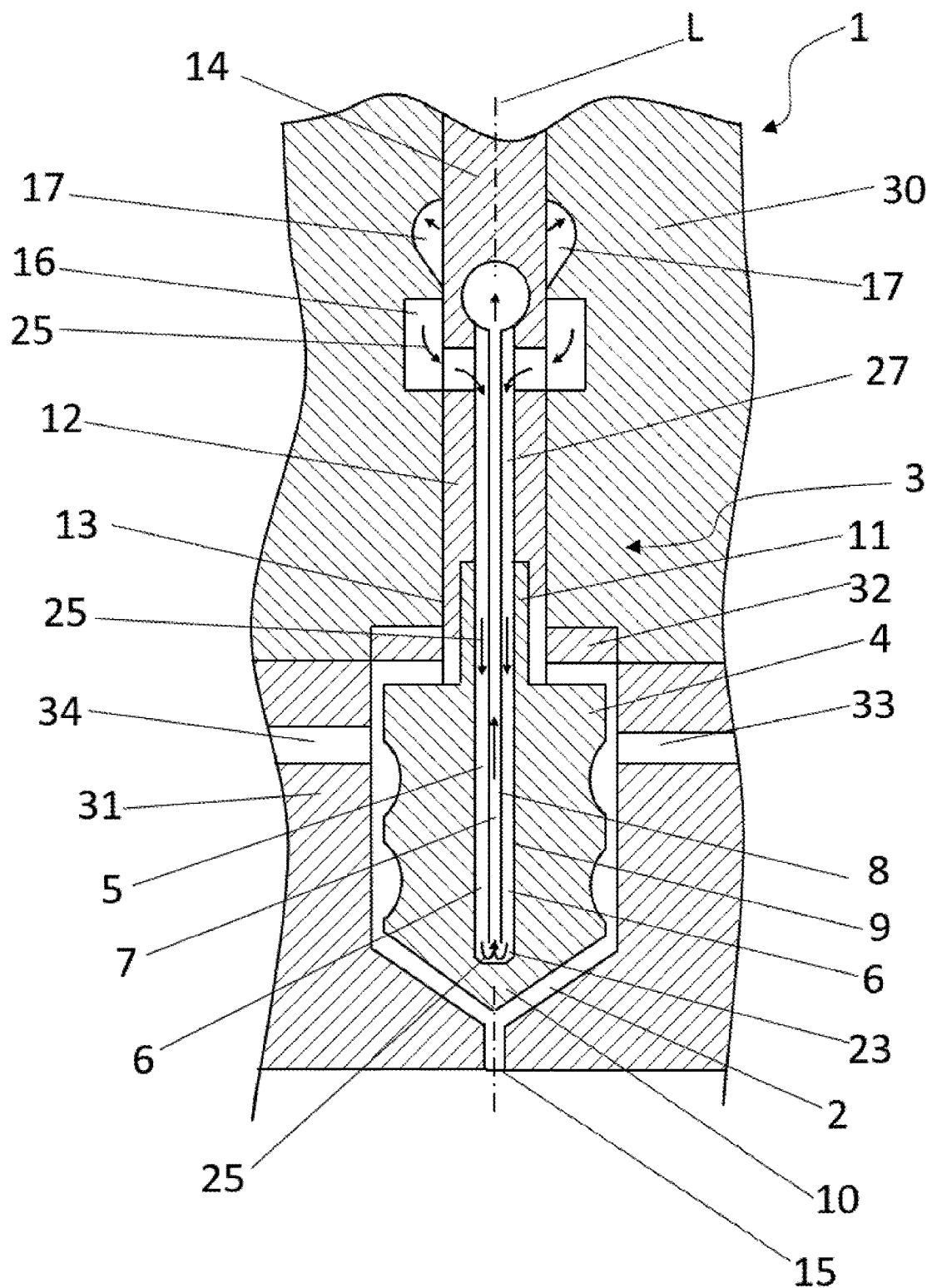
FIG. 1 shows a device for producing a multi-component mixture according to a first embodiment of the invention.

The device 1 for producing a multi-component mixture according to FIG. 1 comprises a mixing chamber 2 and a mixing device 3. The mixing device 3 comprises a stirrer 4 which is arranged in the mixing chamber 2 and is rotatably driven about a longitudinal axis L by a shaft 12. The stirrer 4 is responsible for actively mixing together various components of a multi-component mixture, which components are introduced into the mixing chamber 2 through ducts (not shown). The multi-component mixture is in particular a plastics material.

The fully prepared multi-component mixture can be removed from the mixing chamber through an outlet 15, the outlet 15 being closed and opened by the stirrer 4 which can be moved in the axial direction.

The stirrer 4 has a first end 10 by means of which the outlet 15 can be closed. It also has a second end 11 which is connected to a first end 13 of the shaft 12. A second end 14 of the shaft 12 has a drive (not shown).

In order to keep the soiling of the stirrer 4 caused by the crosslinking of the material in the mixing chamber 2 to a minimum, the stirrer 4 is cooled from the inside. The walls of the mixing chamber 2 can also be provided with cooling channels that allow the mixing chamber 2 to be cooled.

For cooling, the stirrer 4 has a cavity 23 which is delimited by walls 9 and extends from the second end 11 of the stirrer 4 almost to its first end 10. A cooling channel system 5 is formed in the cavity 23 as a temperature control channel system, the walls 9 of the cavity also forming walls of the cooling channel system 5 in the embodiment shown in FIG. 1. The cooling channel system 5 is thus formed by the walls 9 of the cavity 23 and additionally by a pipe 8 which is arranged coaxially in the cavity 23. As an alternative to the variant shown here, an apparatus that heats the stirrer from the inside is also conceivable in a heating channel system as a temperature control channel system. This can have comparable features to the shown cooling channel system 5, with a through-flow of a heating medium being expedient in this case.

In this way, both a supply flow portion 6 which is connected to an inflow portion 16 in the region of the second end 14 of the shaft 12 and a return flow portion 7 which is connected to an outflow portion 17 in the region of the second end 14 of the shaft 12 are formed in the cavity 23. A temperature control medium which is used as the cooling medium, for example water, flows through the cooling channel system 5 formed in this way, as indicated by the arrows 25. The cooling medium flows through the inflow portion 16 into a cavity 27 that extends inside the shaft 12, and from there flows into the cavity 23 of the stirrer 4, which stirrer cavity is fluidically connected to the cavity 27. In this case, the cooling medium flows between the pipe 8 and the walls 9 of the cavity 27, 23 into the region of the first end 10 of the stirrer 4, where it flows into the pipe 8, from there flows into the pipe 28 within the shaft 12, and from there flows to the outflow portion 17.

In the region of the supply flow portion 6, the cooling medium absorbs heat from the material of the stirrer 4 and in so doing cools the surface 29 thereof. Heated cooling medium is transported away in the return flow portion 7.

Figure 2:
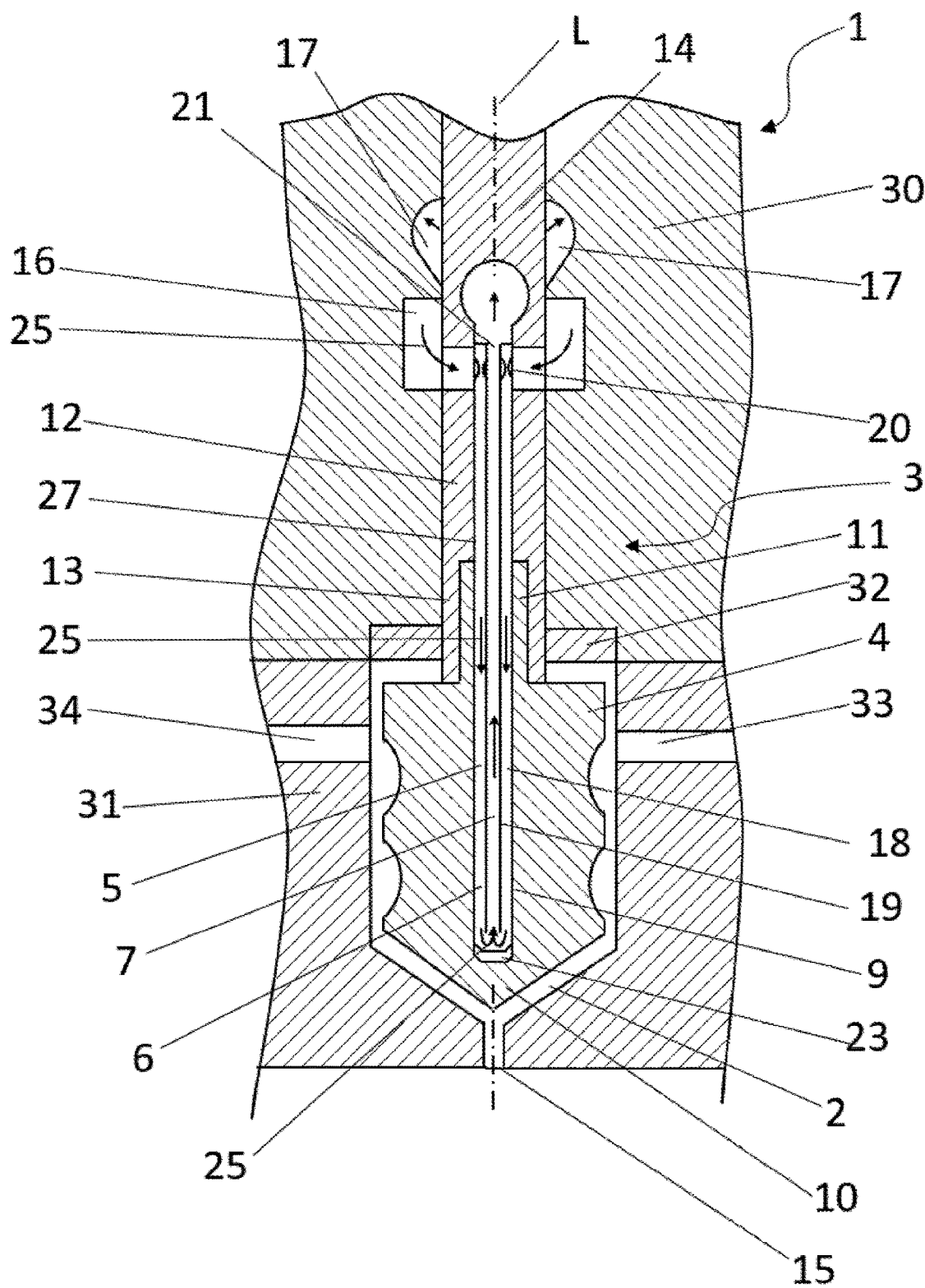
FIG. 2 shows a device for producing a multi-component mixture according to a second embodiment of the invention and FIG. 3 shows a device for producing a multi-component mixture according to a third embodiment of the invention.

FIG. 2 shows a second embodiment of the device 1, which differs from that shown in FIG. 1 in that a temperature control lance designed as a cooling lance 18 is arranged in the cavity 23, 27. This lance extends from the region of the first end 10 of the stirrer 4 up to the region of the second end 14 of the shaft 12. The cooling lance 18 also has a pipe 19 in its interior, a supply flow portion 6 of the cooling channel system 5 being formed outside the pipe 19 and a return flow portion 7 being formed inside the pipe 19. In the region of the second end 14 of the shaft 12, the cooling lance 18 comprises openings of an inflow portion 20 and an outflow portion 21.

The cooling lance 18 can be inserted or screwed into the stirrer 4 and/or the shaft 12, for example. When the stirrer 4 is replaced, the cooling lance 18 can remain connected to the shaft 12.

In order to achieve particularly good heat transfer and thus particularly good cooling performance, a gap between the outer walls of the cooling lance 18 and the walls 9 delimiting the cavity 23 is designed to be as small as possible.

Figure 3:
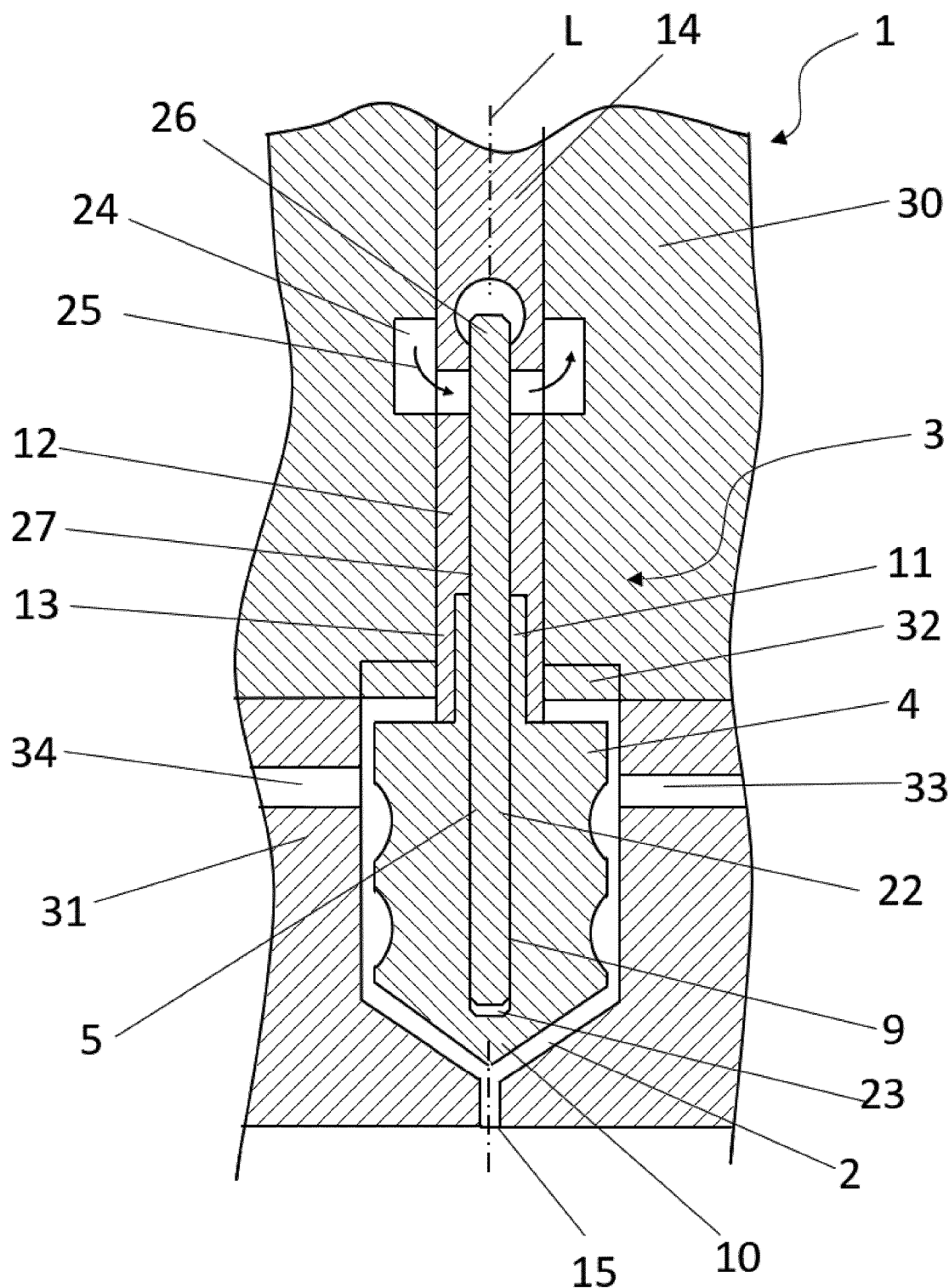

FIG. 3 shows a third embodiment of the device 1, which differs from the embodiments shown in FIGS. 1 and 2 in that the cooling channel system 5 is formed by means of a heat pipe 22 which is arranged in the cavity 23, 27 and extends from the region of the first end 10 of the stirrer 4 into the region of the second end 14 of the shaft 12. A distal end 26 of the heat pipe 22 can have active cooling means 24.

In the embodiment shown, the heat pipe 22 is shown only schematically. This is a heat transport means known to a person skilled in the art in which, during operation, a working medium held in the heat pipe 22 evaporates in the region of the stirrer 4 and flows into a cooling zone located in the region of the distal end 26, where it releases heat and condenses again. In this way, the heat pipe 22 forms a closed system which is particularly simple to integrate into the stirrer 4 and the shaft 12.

Like the cooling lance 18 according to FIG. 2, the heat pipe 22 can be screwed or plugged into the stirrer 4 and/or the shaft 12 and remain connected to the shaft 12 when the stirrer 4 is replaced. A gap between the outer walls of the heat pipe 22 and the walls 9 delimiting the cavity 23 is designed to be as small as possible for efficient cooling.

LIST OF REFERENCE SIGNS 1 device
2 mixing chamber
3 mixing device
4 stirrer
5 cooling channel system
6 supply flow portion
7 return flow portion
8 pipe
9 wall
10 first end
11 second end
12 shaft
13 first end
14 second end
15 outlet
16 inflow portion
17 outflow portion
18 cooling lance
19 pipe
20 inflow portion
21 outflow portion
22 heat pipe
23 cavity
24 cooling means
25 arrow
26 distal end
27 cavity
28 pipe
29 surface
L axis of rotation

The invention claimed is:

1. A device for producing a multi-component mixture, the device comprising a mixing chamber and a mixing device, wherein the mixing device has a stirrer which is arranged in the mixing chamber and is rotatably driven about an axis of rotation (L), wherein a temperature control channel system through which a temperature control medium can flow is arranged inside the stirrer for the purpose of controlling the temperature of the stirrer; wherein the temperature control channel system comprises:

(i) a temperature control lance that is arranged in a cavity of the stirrer, wherein the temperature control lance includes outer walls defining an interior space, a pipe positioned within the interior space, a supply flow portion within the interior space but outside of the pipe for receiving a supply of the temperature control medium, and a return flow portion inside the pipe for receiving a flow of the temperature control medium from the supply flow portion;
or
(ii) a heat pipe that is arranged in a cavity of the stirrer, wherein the heat pipe includes outer walls defining an interior space that represents a closed system relative to the cavity of the stirrer for containing a working medium for transferring heat to the stirrer.

2. The device according to claim 1, wherein the stirrer is arranged on a shaft which is connected to the stirrer in a region of a first end of said shaft and is rotatably driven in a region of a second end of said shaft.

3. The device according to claim 1, wherein the temperature control lance is guided in a cavity of the shaft up to its second end, and an inflow portion and an outflow portion for the temperature control medium are provided in the region of the second end of the shaft.

4. The device according to claim 1, wherein the heat pipe is guided in a cavity of the shaft up to its second end, and active temperature control of the heat pipe is provided in the region of the second end of the shaft.

5. A method for producing a multi-component mixture comprising steps of:
adding multiple components to the mixing chamber of the device according to claim 1;
stirring the components in the mixing chamber with the stirrer; and
controlling temperature of the stirrer by flow of the temperature control medium through the temperature control channel system.

6. The method according to claim 5, wherein the temperature of the stirrer is controlled by removing heat from an interior of the stirrer by means of the temperature control medium.

7. The device according to claim 1, wherein the temperature control lance is removably positioned within the cavity of the stirrer, such that the stirrer is separately detachable from the device relative to the temperature control lance.

8. The device according to claim 1, wherein the heat pipe is removably positioned within the cavity of the stirrer, such that the stirrer is separately detachable from the device relative to the heat pipe.

9. The device according to claim 1, wherein the mixing chamber includes an outlet at a lower end thereof, wherein the outlet can be sealed by a bottom portion of the stirrer.

10. The device according to claim 1, wherein the device defines a vertical axis, and the stirrer is translatable along the vertical axis.

* * * * *